(12) United States Patent
Munshi

(10) Patent No.: US 6,828,065 B2
(45) Date of Patent: Dec. 7, 2004

(54) IONICALLY CONDUCTIVE POLYMER ELECTROLYTES

(75) Inventor: M. Zafar A. Munshi, Missouri City, TX (US)

(73) Assignee: Lithium Power Technologies, Inc., Manvel, TX (US)

(*) Notice: Subject to any disclaimer, the term of this patent is extended or adjusted under 35 U.S.C. 154(b) by 0 days.

(21) Appl. No.: 10/187,483

(22) Filed: Jul. 2, 2002

(65) Prior Publication Data

US 2003/0091904 A1 May 15, 2003

Related U.S. Application Data

(62) Division of application No. 09/340,944, filed on Jun. 28, 1999, now Pat. No. 6,413,676.

(51) Int. Cl.[7] ................................................. H01M 6/18
(52) U.S. Cl. ........................ 429/309; 429/310; 429/314; 429/316; 429/317
(58) Field of Search ................................. 429/309, 317, 429/316, 315, 314, 306, 310

(56) References Cited

U.S. PATENT DOCUMENTS 5,585,039 A * 12/1996 Matsumoto et al. ........ 429/306
6,355,380 B1 * 3/2002 Yun et al. ................... 429/309
6,645,675 B1 * 11/2003 Munshi ...................... 429/306

* cited by examiner

Primary Examiner—Laura Weiner (57) ABSTRACT

A dimensionally stable, highly resilient, hybrid copolymer solid-solution electrolyte-retention film for use in a lithium ion battery in one preferred embodiment has a predominantly amorphous structure and mechanical strength despite contact with liquid solvent electrolyte. The film is a thinned (stretched), cast film of a homogeneous blend of two or more polymers, one of which is selected for its pronounced solvent retention properties. A very high surface area inorganic filler dispersed in the blend during formation thereof serves to increase the porosity of the film and thereby enhance electrolyte retention. The film is soaked in a solution of liquid polymer with liquid organic solvent electrolyte and lithium salt, for absorption thereof. Use of a cross-linked liquid polymer enhances trapping of molecules of the electrolyte into pores of the film. The electrolyte film is sandwiched between flexible active anode and cathode layers to form the lithium ion battery. Novel methods are provided for forming the electrodes, the polymer substrate, and other elements of the battery.

10 Claims, 1 Drawing Sheet

IONICALLY CONDUCTIVE POLYMER ELECTROLYTES

CROSS-REFERENCE TO RELATED APPLICATION

This application is a division of Ser. No. 09/340,944, filed Jun. 28, 1999, U.S. Pat. No. 6,413,676, the priority of which is claimed by applicant herein.

BACKGROUND OF THE INVENTION

A. Field

The present invention relates generally to a range of polymer electrolytes characterized by high ionic conductivity at room temperature and below, improved stability, and ability to be formed in very thin film configuration, for use in lithium ion batteries, and to methods of manufacturing lithium ion batteries comprising such polymer electrolytes.

B. Prior Art

A high energy density rechargeable battery system is currently a highly sought technology objective because of the proliferation of power-consuming portable electronics that demand increasingly greater energy levels, as well as more interest in practical electric-powered vehicles with significantly improved range presently unavailable from lead acid batteries. As a result, lithium rechargeable batteries are the focus of intense investigation around the world. Table I, below, describes the available rechargeable lithium systems which are either in commercial production or under development today. The lithium solid-state polymer electrolyte battery (system 3 in the Table) would be the ideal system for such high power-consumption applications owing to its true flexibility and energy density together with a capability of very high cycle life. However, in its present stage of development, this otherwise enviable system is not viable at temperatures below 60° C.

(1)

As indicated by the above cell reaction, charge and discharge proceed via intercalation of lithium ions into the carbon and metal oxide structure, respectively. Cell voltage at full charge is usually 4.2 volts while cell voltage on discharge is 2.6 volts.

A microporous polypropylene or polyethylene separator separates the two electrodes from shorting electrically, and liquid organic solvents containing a lithium salt as the electrolyte which is usually absorbed into the separator material and portions of the electrode provides high ionic conductivity ($10^{-3}$ to $10^{-2}$ S/cm) and ease of migration of ions between the electrodes of the cell. These batteries are commonly used in portable computers, cellular telephones and camcorders, among other applications. The specific energy and energy density of the lithium ion battery is usually about 125 Wh/kg and 260 Wh/l, respectively. The packaged battery, usually in a hard plastic case, has a much lower energy density than the individual cell (approximately 20% lower). The cycle life (i.e., the number of times the battery can be recharged) of this battery is about 500 to 800 cycles, the self-discharge (i.e., loss of capacity on standing) per month is about 10%, and the cost is currently about $1.00 per Watt-hour of energy. These batteries can be manufactured in near fully automated, high volume production. Although lithium ion battery technology is being commercialized very heavily, numerous safety issues have arisen. For example, cells that are abused under crush test or high temperature test have been known to explode and ignite.

TABLE 1

Performance Characteristics of Lithium Rechargeable Batteries

| | System | Energy Wh/kg | Density Wh/liter | Voltage (V) | Self-Discharge (%/month) | Cycle Life | Electrolyte |
|---|---|---|---|---|---|---|---|
| 1 | Lithium Ion | 100–120 | 260–280 | 3.6 | 10–12 | 500–800 | Liquid (Organic) |
| 2 | Lithium Ion Polymer | 100–120 | 260–280 | 3.6 | <8 | 2500 | Solid-Liq. |
| 3 | Lithium Polymer | 250–300 | 350–400 | 3.6 | <<1 | >>1000 | Solid (Organic) |

(Note: In Table 1, Wh/kg is specific energy (gravimetric); Wh/liter is energy density (volumetric).)

The lithium ion liquid electrolyte battery (system 1) is presently the only commercial chemistry described in Table 1. No generic lithium ion chemistry exists since each manufacturer has its own chemistry containing different positives, different negatives, binders, electrolyte and formation process. These are major factors influencing cycle life and the charge and discharge profiles. The most common lithium sink (i.e., place where the ion inserts) negative electrodes in a lithium ion battery are carbon-type insertion compounds, while layered metal oxides of the $LiMO_2$ type (where M=Ni or Co) or spinel lithium manganese oxides of the $LiMn_2O_4$ type are currently used as preferred lithium source positive electrodes. These electrodes are usually calendared onto metallic current collectors (which are about 25 to 50 microns thick). The overall process of these batteries may be written as:

To overcome the disadvantages inherent in liquid electrolytes, and to obtain superior long-tem storage stability, an interest has arisen in solid polymeric electrolytes in which ion mobility is achieved through coordination by sites on the polymer chain of electrolyte ions, thus promoting electrolyte dissolution and salt dissociation. An all-solid-state battery using an ionically conductive polymer membrane as the electrolyte would have several attractive features. It could be produced in virtually any shape and size, in thin film power cells or thick film energy cells, by automated fabrication techniques, as well as made reasonably rugged and leakproof, with low self-discharge, and have high open-circuit potential using a lithium metal anode. Such features represent a unique combination of properties and give rise to the possibility of using them as either secondary or primary devices across a wide range of applications.

Polyethylene oxide (PEO), a polymer examined extensively for the present application, is able to form stable complexes with a number of salts. Because of its low ionic conductivity of about $10^{-9}$ to $10^{-8}$ S/cm at ambient temperature, batteries using this material were found to require being operated at a temperature of 100° C. or higher. A major problem observed with PEO-based electrolytes at temperatures below 60° C. is their high crystallinity and associated low ion mobility. The crystalline structure of many polymers, including PEO, results in a weaker structure. In recent years, many radically different approaches have been taken to improve the conductivity of PEO and PEO-based polymers, which have also led to the proposal of other polymers for this purpose. These approaches included modification of existing polymers, synthesis of new polymers, forming composite polymers with ceramic materials, using plasticizer salts to increase ion transport and mobility of the cation, using plasticizing solvents in the polymer again to increase the ionic character of the cation, and other approaches. Several review articles describe these approaches in detail, e.g., "Technology Assessment of Lithium Polymer Electrolyte Secondary Batteries," by M. Z. A. Munshi, Chapter 19 in Handbook of Solid State Batteries and Capacitors, Ed. M. Z. A. Munshi (World Scientific Pub. Singapore), 1995, and A. Hooper, M. Gauthier, and A. Belanger, in: "Electrochemical Science and Technology of Polymers—2, " Ed. R. G. Linford (Elsevier Applied Science, London), 1987.

These approaches have not resulted in adequate conductivity enhancements on the polymer electrolytes desired for battery operation at room temperature. As a result, another approach has been taken in which plasticizing solvents or low molecular weight polymers are added to the polymer electrolyte to increase ionic conductivity of the PEO-based polymer electrolyte. The purpose of the latter is to increase the ionic mobility and concentrations of the charge carriers in the solid polymer electrolyte by enhancing the dissociation of the lithium salt. It is believed that the lithium ion is also solvated to the solvent molecule and participates in enhancing the ionic mobility. Many electrolyte composites incorporating low molecular weight polymers or liquid organic solvents have been prepared and have demonstrated high room temperature conductivity approaching those of the typical non-aqueous liquid electrolytes.

For example, Kelly et al, in J. Power Sources, Vol. 14, page 13 (1985) disclosed that adding 20 mole percent of liquid polyethylene glycol dimethyl ether polymer (PEGDME) to solid PEO polymer results in an increase in the ionic conductivity of the final plasticized polymer from $3 \times 10^{-7}$ S/cm to $10^{-4}$ S/cm at 40° C. However, it was found that the mechanical property of this material is very poor. In U.S. Pat. No. 4,654,279 (1987), Bauer et al disclosed the thermal cross-linking of polymers consisting of epoxies and methacrylates and plasticized with a solution of $LiClO_4$ in a 400 MW PEG resulted in a conductivity of $4 \times 10^{-4}$ S/cm at 25° C. The '279 patent describes a polymeric electrolyte consisting of a two phase interpenetrating network (IPN) of a mechanically supporting phase of a continuous network of a cross-linked polymer and an ionically conducting phase comprising a metal salt and a liquid polymer such as liquid PEG.

Many of these low molecular weight polymers have a relatively low dielectric constant when compared to their liquid solvent counterpart, and thus limit the number of charge carriers in the plasticized polymer. In an effort to overcome this hindrance, high dielectric constant liquid organic solvent such as ethylene carbonate (EC) and propylene carbonate (PC) have been incorporated into the host polymer. The purpose was both to increase the number of charge carriers and further increase the room temperature conductivity of the polymer. The use of these organic solvents to plasticize polymers such as poly(vinyl acetal), poly(acrylonitrile), poly(vinyl acetate), and hexafluoropropene-vinylidene fluoride copolymer (Viton™) occurred as early as 1975 (see Feuillade and Perche, Journal of Applied Electrochemistry, Vol. 5, page 63 (1975)). However, the mechanical properties of these polymers were so poor that they had to be supported on porous matrices. Later, Armand produced a system with good room temperature conductivity ($10^{-4}$ S/cm) and good mechanical properties by cross-linking the Viton™ and plasticizing with a solution of 1M of $LiClO_4$ in PC (Proc. Workshop on Li Non-Aqueous Battery Electrochemistry, The Electrochemical Soc., Vol. 80–7, page 261 (1980)). Polyvinylidene fluoride (PVDF) and polyacrylonitrile (PAN) were evaluated in the early 1980s and have also been doped with a variety of liquid polar solvent, yielding room temperature conductivities as high as $10^{-3}$ S/cm. Subsequently, PVDF has been the subject of a recent patent of Bellcore (U.S. Pat. No. 5,296,318).

The use of PC in an ionically conductive matrix containing oxygen donor atoms such as PEO complexed with a lithium salt was first presented by the applicant herein (see paper presented at the Fall Meeting of the Electrochemical Soc., Oct. 18–23, 1987). Although room temperature battery performance data was presented, the polymer electrolyte did not exhibit good mechanical property.

In the late 1980s, a series of patents were issued to MHB Inc., generally relating to the use of liquid organic solvents in various types of polymeric materials including PEO, materials based on acrylates, and low MW PEG acrylates. These patents describe predominantly radiation curing methods for the preparation of an interpenetrating polymeric network (IPN) containing various types of polyacrylates and liquid organic solvents. Although electron beam curing was stated to be the preferred method to polymerize the IPN, thermal and ultraviolet curing methods were also proposed. It was thought that containing the PC solution in the matrix of the polymeric network would therefore yield a high ionic conductivity comparable to that of PC itself. Indeed, this was demonstrated in typical polymeric networks yielding conductivities of about $2 \times 10^{-3}$ S/cm at room temperature. However, with solvent contents in the 60% to 80% range, oozing of the liquid was a major problem. An advantage with using electron beam curing compared to UV radiation is that the electron beam can penetrate through metallic components, and hence complete prototype cells can be made and polymer electrolyte cured in-situ. An advantage with acrylates is their ability to hold the solvents fairly well, but mechanically they are very weak. Stronger designs of acrylates have poor solvent retention capabilities. Acrylates are also good ionic conductors without solvents.

An offshoot of the lithium ion liquid electrolyte system is the lithium ion polymer electrolyte battery (system 2 in Table 1, above) that has been in development for the past four to five years. Lithium ion cells utilizing gelled electrolytes offer all the advantages of lithium ion liquid electrolyte cells and are becoming widely accepted by many companies not only because they potentially offer good form factors for a large variety of consumer electronics devices such as slim notebook computers and cellular telephones, but because they also offer improved safety over liquid electrolyte cells. The electrode chemistry is the same, but the liquid electrolyte (up to 70%) in this case is absorbed in a polymer membrane instead of the microporous polypropylene separator. The current technology based on liquid organic solvents absorbed in polyvinylidene fluoride (PVDF) polymer developed at Bellcore under U.S. Pat. No. 5,296,318 ensures good interfacial contact, which leads to relatively low internal cell resistance and, thus, good rate capability and long cycle life (up to 2500 cycles).

The current method of fabricating the polymer-solvent electrolyte involves a complex process in which PVDF is cast from a plasticizer solution of PVDF and DBP (di-butyl phthalate) to create some porosity for the liquid organic solvent. The DBP is then removed using either methanol or di-ethyl ether. The liquid organic solvent is then added to this polymer. This process is very expensive and involves hazardous chemicals.

Ironically, PVDF is non-conducting compared to many of the above-mentioned polymers, and consequently merely holds the liquid organic solvents in its structure similar to a sponge holding water. Because the technology uses an extensive amount of liquid electrolyte solvent absorbed in a polymer, it is not easy to manufacture cells at high speed. Automation of this technology may be very difficult. The gelled electrolyte cells incorporate very thick electrode/electrolyte structures (50 to 75 microns) onto metallic current collectors (25–50 microns) that not only add unnecessary weight and volume to the battery, but result in a lower cell performance. It is believed that many users incorporate an expanded gauze made of copper (anode) and aluminum (cathode) to coat the electrodes, instead of planar copper and aluminum foils. This adds more weight and volume to the already large percentage of inactive components of the cell. Present indications regarding this technology from various sources are that the energy density (gravimetric and volumetric) are lower than the existing lithium ion batteries, cycle life is not particularly impressive, and cell cost runs several dollars per Watt-hour. Like PEO, PVDF is highly crystalline, thus weakening its strength. On the other hand, acrylates are amorphous and can hold solvents well because of their ability to be cured in-situ, thus "trapping" the solvents into the polymer matrix.

When this technology emerged, form factors and flexibility were among its most praised features, but currently it is used to manufacture only flat prismatic cells which exhibit little flexibility. Although scientific articles have been published asserting that such polymer electrolyte batteries can be produced in very thin film form with flexibility, these batteries tend to lose performance over time when the cell is oriented because the solvent is not completely immobilized in the polymer electrolyte. In a battery standing upright, the liquid solvents travel to the bottom of the cell, and during charge and discharge the current along the cell height will differ because of the difference in conductivity at the bottom and top of the electrode. Such cells tend not to have very high cycle life, and lose capacity as a result of poor charging and discharging.

While the addition of organic plasticizers may offer a solution to low ionic conductivity in polymer electrolytes, they necessarily introduce additional deleterious effects on other electrolyte properties such as stability in contact with the polymer matrix. Indeed, it is now known through manufacturers and suppliers of PVDF resins to the battery industry that PVDF is unstable in the organic solvents presently used in lithium ion polymer electrolyte batteries, dissolves to an extent, and that the instability worsens at elevated temperatures. The result is a breakdown in the PVDF mechanical integrity and loss of separator property, with the possibility of electrical shorting. Another problem found with PVDF is that the polymer swells and loses dimensional stability when it contacts liquid organic solvent. Consequently, the battery would exhibit poor electrode/electrolyte interface during thermal cycling and poor mechanical property of the gel compared to that of the polymer. In addition, polymer electrolytes based on such designs cannot be manufactured in very thin film forms to reduce overall resistance and, hence, cell resistance, since the polymer has insufficient strength to hold the liquid organic solvents in its matrix. For such a system to be fully functional it must be based on a thick film concept, which increases overall cell resistance and reduces energy density because of a reduction in the active components in the cell.

Thus, all of the aforementioned prior art techniques which have been employed in an effort to improve ionic conductivity, mechanical strength, safety, chemical stability, and cost reduction by simplifying the synthesis of polymer electrolytes, exhibit one or more substantial problems.

SUMMARY OF THE INVENTION

Accordingly, it is a principal object of the present invention to provide a base polymer material for a polymer electrolyte that is insoluble in the organic solvents presently used in lithium ion batteries and is highly stable with temperature.

Another object of the invention is to provide a base polymer material for a polymer electrolyte that exhibits little or no swelling characteristics when in contact with liquid organic solvents, compared to PVDF.

Another object of the invention is to provide a base polymer material that is predominantly amorphous in nature.

Still another object is to provide a base polymer material for a polymer electrolyte that is mechanically stronger than PVDF when in contact with liquid organic solvents.

Still another object is to provide a base polymer electrolyte with ionic conductivity.

Yet another object of the invention is to provide polymer electrolyte compositions which are more conductive at lower levels of organic solvents than prior art polymer electrolyte-solvent compositions.

A further object of the invention is to provide polymer electrolyte compositions in which the solvent is immobilized in the polymer, to allow lithium ion batteries constructed from such compositions to be used in any orientation.

Another object of the invention is to provide polymer electrolyte compositions that can be manufactured in very thin film form, provide low resistance and excellent flexibility.

Still another important object of the invention is to provide a lithium ion battery with polymer electrolyte compositions described in the preceding enumerated objects.

A further object is to provide such lithium ion polymer electrolyte batteries with ultra-thin current collectors such as very thin metallic elements or metallized polymer substrates for improved energy density, power density, higher capacity utilization, higher cycle life, greater charge-discharge efficiencies, lower polarization, greater safety, and greater reliability, and which be produced at high speed, lower cost, and with improved form factors.

Another object of the invention is to coat the thin substrate with very thin active anode and cathode material.

A related object is to laminate the anode and cathode elements on both sides of the metallized polymer substrate material so as to yield a highly flexible electrode.

The electrolyte of the present invention is preferably a cationic conductor, is very flexible and somewhat dry, is of low cost, and in some preferred embodiments of the invention is constructed in very thin film format. Polymer electrolytes of this design can be combined with various negative electrodes such as an alkali metal, alkaline earth metal, transition metal, ion-insertion polymers, ion-insertion inorganic electrodes, carbon insertion electrodes, and tin oxide electrodes, among others, and with various positive electrodes such as ion-insertion polymers, and ion-insertion inorganic electrodes, to provide batteries and supercapacitors having high specific energy (Wb/kg) (gravimetric) and energy density (Wh/l) (volumetric), high cycle life, low self-discharge, and which provide improved safety.

One embodiment of a solid base polymer material of a polymer electrolyte of a lithium ion battery according to the invention is a thin film that includes a hybrid copolymer solid-solution homogeneous blend of at least two polymers, one selected from a polar group having pronounced solvent retention properties, and the other selected from a second group consisting of polyester (PET), polypropylene (PP), polyethylene napthalate (PEN), polycarbonate (PC), polyphenylene sulfide (PPS), and polytetrafluoroethylene (PTFE), or a combination of two or more thereof. The specific polymer of the latter group and its concentration in the blend are selected to tailor at least one desired property of the base polymer material. In a preferred embodiment, the polymer selected from the polar group is PVDF. In a two polymer blend, the concentration of one is in a range from 1% to 99% by weight, and the remainder being the other. The base polymer material may include other substances such as an acrylate, polyethylene oxide (PEO), polypropylene oxide (PPO), poly(bis(methoxy-ethoxy-ethoxide))-phosphazene (MEEP), polyacrylonitrile (PAN), polymethylmethacrylate (PMMA), polymethyl-acrylonitrile (PMAN), etc.

In a method of preparing such a base polymer material, resins of the two or more polymer constituents, the one from the polar group being selected at least in part for its pronounced solvent retention properties, are blended preferably in a co-extrusion twin-screw process, to produce a hybrid melt-cast film. This film is then subjected to stretching by biaxial orientation in machine direction and transverse direction, to a desired final thickness, preferably in a range from 0.5 to 25 microns.

In another embodiment, an electrolyte-retaining base polymer material for a lithium ion battery is a solid-solution polymer thin film cast from a solution of PP, PVDF and cured acrylate monomer/oligomer from which a solvent in which those constituents were dissolved has substantially evaporated. A liquid or semi-liquid electrolyte solution containing a lithium salt is absorbed within the thin film. In a process of manufacture of this embodiment, the PP, PVDF and acrylate monomer/oligomer are dissolved in a hydrocarbon solvent to form a polymer solution, which is then cast in a thin film, in part by evaporation of the solvent. The film is then soaked in liquid electrolyte solution containing lithium salt, for absorption of the electrolyte within the film, and the acrylate monomer/oligomer is cured by subjection to electron beam or ultraviolet radiation.

A dimensionally stable embodiment of hybrid base copolymer solid-solution blend film for a lithium ion battery, the film being capable of electrolyte retention without appreciable swelling, is produced by a method in which PVDF and PP are mixed homogeneously to form a copolymer blend thereof. A very high surface area inorganic filler—either fumed silica or alumina—is then dispersed with a concentration in a range from about 0.1% to about 30% by weight into the copolymer blend to enhance the porosity and mechanical stability of the thin film into which the copolymer blend with inorganic filler is cast. Finally, after extrusion of the resin blend and biaxial orientation, the resultant film is soaked in a liquid solvent electrolyte for absorption and retention in the film. Preferably, the film is soaked in a mixture of ethylenecarbonate-diethyl carbonate (EC-DEC), EC-dimethyl carbonate (EC-DMC), PC-EC-DMC or PC-DEC, each of the solvent mixtures containing a lithium salt such as (by way of example) lithium hexafluorophosphase $LiPF_6$, lithium perchlorate $LiClO_4$, lithium tetrafluoro-borate $LiBF_4$, lithium hexafluoroarsenate $LiAsF_6$, lithium tetrachloroaluminate $LiAlC_4$, lithium trifluoromethane sulfonate $LiCF_3SO_3$, lithium bis (trifluoromethane sulfonyl) imide (lithium imide) $LiN(CF_3SO_2)_2$, or lithium methide $LiC(SO_2CF_3)_3$ for ionic conduction. Dispersion of the inorganic filler into the copolymer blend is performed during co-extrusion of the PVDF and PP.

Still another embodiment of the invention resides in a dimensionally stable, highly resilient, hybrid base copolymer blend electrolyte film of predominantly amorphous structure having mechanical strength when in contact with liquid solvent electrolyte, for a lithium ion battery. This embodiment preferably comprises a copolymer blend of PVDF and either PP or PEN, with the very high surface area inorganic filler dispersed therein. To generate high ionic conductivity of the hybrid copolymer electrolyte film at reduced levels of liquid organic solvent, a liquid polymer with liquid organic solvent electrolyte and lithium salt is introduced into the film, and the electrolyte is immobilized to allow molecules of the liquid polymer to trap molecules of the electrolyte into pores of the film. Preferably, the liquid polymer is cross-linkable, such as a polymer based on acrylates and PEO-based materials, and radiation curing is performed to cross-link the liquid polymer for trapping of molecules. Alternatively, some immobilization of the liquid organic solvent electrolyte may be achieved by using a non-ionizable liquid polymer.

Any of these polymer electrolyte films may be used to form an electrochemical cell, particularly a lithium ion battery, by tightly sandwiching the film between thin, flexible active anode and active cathode layers.

For example, one embodiment of a thin film lithium ion battery is formed from a resilient flexible hybrid polymeric electrolyte thin film that includes a homogeneous blend of at least two polymers with inorganic filler dispersed therein to increase surface area and porosity of the hybrid film, impregnated with a semi-liquid or even dry solution of liquid polymer, organic solvent electrolyte and lithium salt; and a pair of spaced-apart flexible thin film electrodes, each including a polymer substrate having an adherent electrically conductive layer thereon, the hybrid film being tightly sandwiched between the pair of thin film electrodes. The polymer substrate of each of the anode and cathode is preferably selected from a group of polymers including PET, PP, PPS, PEN, PVDF and PE, and each polymer substrate is metallized to form the conductive layer thereon.

According to another aspect of the invention, a lithium ion battery electrode comprises an ultra thin film metal substrate for at least one of a cathode substrate and an anode substrate of a lithium ion battery, the ultra thin film metal substrate having a thickness in a range from about one micron to about 10 microns. The ultra thin film metallized polymer substrate includes a polymer material selected from a group of polymers including PET, PP, PPS, PEN, PVDF, and PE, and has a thickness in a range from about 0.5 micron to about 50 microns, thereby rendering it very flexible for ease of coating and handling, to avoid kinking and deformation thereof, during manufacture of lithium ion batteries.

The lithium ion battery polymer substrate may comprise a layer of polymer material, and a low resistance metallization layer having a conductivity in a range from about 0.01 ohm per square to about 1 ohm per square overlying and adhered to a side of the polymer material. Preferably, the layer of polymer material has a non-metallized margin with a width in the range from about one mm to about three mm. Preferably, also, a low resistance metallization layer having a conductivity in the aforementioned range overlies and is adhered to each side of the polymer material, and both sides of the layer of polymer material have such a non-metallized margin present at the same edge of the layer of polymer material.

According to yet another aspect of the invention, a method of fabricating a thin film lithium ion rechargeable battery includes incorporating an ultra thin film metallized polymer substrate in the battery during fabrication thereof, wherein the polymer layer in the substrate has a thickness in a range from about 0.5 micron to about 50 microns, in conjunction with very thin film battery electrode/electrolyte structures having thickness less than 5 microns/10 microns, respectively, wherein the thickness of the metallization layer on the polymer layer is selected according to desired conductivity thereof, e.g., less than about 0.01 micron.

The invention also provides novel methods of coating an ultra thin film metallized polymer substrate for a thin film lithium ion battery with very thin film active anode material and active cathode material. One method comprises steps of milling each of the anode material and the cathode material in a separate solvent to reduce the particle size of the respective material, injecting respective ones of the materials directly onto the substrate at opposite sides thereof, and subsequently drawing each of the materials at opposite sides of the substrate into a thin film of desired thickness using wire wound rods or Mayer rods of different wire diameters to control wet slurry thickness.

Another coating method includes incorporating each of the materials into its own aerosol mix, spraying atomized aerosol of each material directly on respective opposite sides of the film substrate while moving said substrate past the points of aerosol spray at high speed, and curing the sprayed material either by drying or radiation. Yet another coating method comprises evaporating the respective electrode material directly onto respective opposite sides of the substrate.

Also according to the invention, a method of fabricating a thin film lithium ion battery involves laminating anode and cathode elements on respective opposite sides of a double-metallized polymer substrate, whereby to yield a highly flexible electrode structure for the battery. Non-metallized margins are provided on each of the anode and cathode elements on the opposite sides of the metallized polymer substrate, and metal is sprayed on opposite ends of the laminated metallized polymer substrate for terminations thereto. These techniques enable the provision of a ratio of substrate thickness to active electrode thickness less than about 0.5.

BRIEF DESCRIPTION OF THE DRAWINGS

The above and still further aims, objectives, features, aspects and attendant advantages of the present invention will become apparent from the following detailed description of a preferred embodiment and method of fabrication of a thin film lithium ion battery in accordance with the invention, constituting the best mode presently contemplated of practicing the invention, when taken in conjunction with the accompanying drawing, in which.

DESCRIPTION OF THE PREFERRED EMBODIMENTS AND METHODS

According to a first aspect of the present invention, a range of base polymer compositions is provided for the membrane of the electrochemical cell with improved chemical stability in lithium ion battery solvents and improved chemical stability as a function of temperature. Polymer materials with high breakdown voltages or strengths and low dissipation factors, such as those employed in film capacitors, have been found to be chemically more stable than other materials with liquid organic solvents.

PVDF has lower electrical stability and breakdown voltage than many capacitor-grade polymer materials, including PET, PP, PEN, PC, PPS, and PTFE. This is true even when PVDF is combined with hexafluoropropylene (HFP), and despite its good solvent retention properties, making it unstable to an extent in lithium ion battery electrolytes.

Polar polymer PVDF currently used in lithium ion gelled electrolyte batteries is a partially crystalline linear polymer with a carbon backbone, in which each monomer $\{CH_2—CF_2—\}$ unit has two dipole moments, one associated with $CF_2$ and the other with $CH_2$. It is used in a physical mixture form with HFP in the ratio of about 9:1 PVDF:HFP, and solvent cast to make the polymer blend. In the crystalline phase, PVDF exhibits a variety of molecular conformations and crystal structures depending on the method of preparation. The extruded or cast material usually contains 40 and 60% crystalline material in one or both of the principal crystalline phases, alpha and beta. The alpha phase predominates in material cast from the melt. This phase is converted to beta phase by mechanical deformation of the material at temperatures less than 100° C. PVDF's physical strength is weakened as a consequence of its crystallinity.

Although materials based on PET, PP, PEN, PC, PPS and PTFE are found to have improved chemical stability over PVDF, especially in common battery electrolyte solvents such as ethylene carbonate, propylene carbonate, diethyl carbonate, dimethyl carbonate, and so forth, and in mixtures of these solvents, such materials do not have the same solvent retention properties as PVDF. The first aspect of the invention provides new base polymers for polymer electrolytes such as PET, PP, PEN, PC, PPS, PTFE, and so forth, with high dielectric strength and lower dissipation factor by forming a copolymer solid solution of mixed polymers thereof, either singly or preferably in combination with one another, in combination with PVDF.

Each polymer or combination of polymers has its own particular properties and can be selected to meet specific design requirements for the battery, such as degree of flexibility, strength, chemical stability, temperature stability, and processing difficulties, to name a few. For example, PPS mixed with PVDF in a concentration of 1 to 99 parts by weight provides a much stronger tensile strength copolymer than PPS mixed with PET. By way of further example, a mixture of polyethylene (PE) and PET with PVDF provides a dimensionally stable material which can be cast in very thin gauges, compared to PE or PET alone or in mixture without PVDF.

The copolymer solid-solution of the present invention, then, is composed of a first polymer selected from a group consisting of PET, PP, PEN, PC, PPS, and PTFE, or a combination of two or more polymers from that group, in mixture with a second polymer selected from a group consisting of PVDF or other polymers with excellent solvent retention properties. These first and second polymers are combined in a ratio ranging from 1 hundredth (1%) to 99 hundredths (99%) parts by weight of the first polymer and the remainder of the mixture being of the second polymer, the constituents and the ratio being selected according to specific design requirements for the lithium ion battery. For example, the first polymer may be PP in a proportion of 1 part to 99 parts with the second polymer which may be PVDF in a proportion of 99 parts to 1 part. PVDF has a melting point of 171° C., while PP has a melting point of 189° C. The closeness of their melting points ensures good melt blending and similar rates of cooling of these polymers, without polymer segregation.

This two-polymer blend is easily extended to a three or more polymer blend to tailor the specific properties desired for the final copolymer solution.

Other polymer hybrid blends may comprise PVDF, PP, PEN, PPS, PC, PET, and PTFE. Others are based on high molecular weight groups such as the different types of acrylates, PEO, PPO, including those based on random copolymers such as oxymethylene linked PEO; block copolymers such as PEO-PPO-PEO cross-linked with tri-functional urethane; comb-branched block copolymers such as MEEP, PAN, PMMA, PMAN; networks such as triol-type PEO cross-linked with difunctional urethane; and poly (oligo)oxyethylene)methacrylate-co-alkali metal methacrylate; polysiloxanes and their copolymers.

A typical preparation of a hybrid copolymer solid-solution blend, using examples of PVDF and PP, includes homogeneously mixing, by co-extrusion (twin screw), selected homopolymer high purity PVDF (Solvay) and PP (Exxon or Huntsman) resins to form a melt-cast film. The resins are fed separately into the extruder via hoppers, and blended with homogenization to form the resin melt-cast dielectric film. An extruded method is preferred over the so-called "blown bubble" method because closer thickness tolerances can be achieved. Operating conditions of the extrusion process, including temperature, throughput, die opening and width, etc., may be adjusted until a good quality melt-cast film is obtained. The operating conditions will vary for each composition even if the resin materials are the same. For multi-resin extrusion, the resin pellets are mixed according to the type of extrusion system available. For example, for a tertiary component system, resin copolymers of PVDF and PP could be formed as one component and either PPS or PC or PET or PEN could be used as the second component in a twin screw extruder. Alternatively, the entire resin pellets of the mixture could be melted before extrusion into a melt-cast.

Even though PVDF melts at 171° C. and PP melts at 189° C., the resin melt is usually at significantly higher temperatures, typically at about 250° C. to 300° C. The resin melt is injected onto a chilling-wheel to cool the resin and form a solid film. Because of the higher temperature of the resin melt, adequate heat exists within the polymer during injection of the melt to allow stretching to a thinner sheet before ultimately being stretched further and pulled wider to a still thinner sheet during machine direction orientation (MDO, i.e., in the direction of the film travel).

The extrusion temperature and the throughput of the individual resin will vary depending upon the formulation composition, and the throughput die opening and width will depend upon the desired thickness and width of the final film. Typically, these parameters are varied to achieve a melt-cast resin thickness in a range from about 100 to 200 microns, with preference for the thinner end of this range, so as to achieve a final film thickness of about 4 microns at the end of the processing run, and a width in a range from about 20 to 30 inches. Hence, if a final film thickness of about 2 microns is desired, the starting melt-cast thickness should be in a range from about 50 to 100 microns. The wide range of variation present in these numbers is because each polymer will stretch and thin differently, and processing at various stages must be adjusted to obtain the most optimum film desired without breaking, wrinkling, or overheating of the film web, for manufacture at the desired rate. Typically, achievement of a good quality film means that the film is clean of dust or specks; has no bubbles, pinholes or other visible inclusions or impurities within the film; is static-free (to preclude attracting dust particles); and is wrinkle-free, to mention its principal attributes.

The melt-cast film is then bi-axially oriented, first being pulled along and through several rollers for feeding it under proper tension into the MDO heated chamber where it is stretched so as to exit the chamber with a typical film thickness in a range from about 25 to 50 microns. The MDO chamber has a series of rollers and tension control system that stretches the film in the direction of film travel to produce a thinner film with a more uniform thickness. The film exits the MDO chamber at a speed which is faster than that at entry, depending upon the film thickness at the end of the MDO run. For example, a melt-cast film thickness of 100 microns at entry into the MDO chamber, which is stretched therein to a film thickness of 25 microns, will exit the MDO chamber at four times its entry speed. Here again, the process parameters in the MDO chamber are adjusted—to control conditions such as line speed, film tension, stretching ratios, and so forth, for optimum film quality and desired final thickness. These conditions are dependent not simply on the final film thickness, but primarily on the properties of the resin. The parameters chosen in the first stage of the film processing, i.e., extrusion and melt-cast film production, will affect the parameters chosen in the second stage of the film processing, i.e., the MDO stretching.

The thinner film exiting the MDO chamber is fed through additional rollers to maintain proper tension, and then enters the transverse direction orientation (TDO) chamber where it is stretched in the transverse direction by the tenter method. This is a conventional technique in which the film is seized by a continuous series of mechanical jaws at both ends of the film width just before the film enters the TDO chamber. As in the case of the MDO chamber, the TDO chamber is heated. This chamber typically has a length in a range from about 40 to 100 feet, depending upon the extent of film production. Width of films being processed through the chamber may vary from two meters to several meters.

As the film moves forward in the TDO chamber, the mechanical jaws move outward and thereby stretch the film to make it thinner and wider, typically to a final thickness in a range from about 0.5 to 25 microns and a width in a range from about 80 to 400 inches. At the opposite (i.e., exit) end of the TDO chamber, the jaws are automatically actuated to release the further thinned and widened film for winding onto paper or plastic cores. As a result of the stretching, the speed of the film at exit from the TDO chamber is considerably faster than the film speed at entry. For example, a film with 100 micron melt-cast thickness exiting the MDO chamber at 25 microns thick travels at four times the speed at entry, as noted above, and if it has then been stretched to a final thickness of 2.5 microns, will exit from the TDO chamber with a speed which is 40 times the speed of the original melt-cast film. Here also, the processing parameters of the TDO chamber will depend upon desired film thickness as well on production feasibility. Film speed and stretching ratio in the transverse direction in the TDO chamber will determine the final film thickness. The dwell time selected for the film in the TDO is also important, as it controls the reduction in film thickness without breakage.

This basic process is believed to be novel to PVDF copolymer manufacture for lithium ion battery applications.

According to another embodiment of the invention, polymers from three groups listed above, e.g., PP, PVDF and acrylate monomer/oligomer, are dissolved in an appropriate solvent, e.g., a hydrocarbon, to form a polymer solution. The solvent is evaporated completely after the polymer solution is cast in a thin film. The solid-solution thin film polymer is then soaked in a liquid electrolyte solution containing a lithium salt and then the acrylate monomer/oligomer is cured using electron beam or ultraviolet radiation.

According to yet another embodiment of the invention, a hybrid base polymer blend is formed wherein the electrolyte film is dimensionally stable when in contact with liquid solvent electrolytes and will not swell to any appreciable extent. The applicants herein have found that dispersing very high surface area fumed silica or alumina in concentrations of 0.1 to 30 weight percent to some copolymers blends of PVDF and PP provides improved mechanical stability when soaked in mixtures of EC-DEC and EC-DMC. The inorganic fillers can be added during processing of the hybrid copolymer using the extrusion process. The swelling values observed for such material blends are less than 8% compared to about 20 to 80% for a wide range of different blends of fluoropolymers, including poly(chlorotrifluoro-ethylene, poly(ethylene-chlorotrifluoroethylene), poly(fluorinated ethylene-propylene), ETFE, PTFE, HFP and PVDF and mixtures of the fluoropolymers. The addition of the inorganic fillers provides a simpler method of creating porosity in the polymer structure compared to the traditional method using plasticizer DBP.

The fumed silica according to the present invention is preferably highly pure silica in an amorphous crystalline structure, with a fine particle size and a very high specific surface area. The fine particle size is important not only to maintain the high specific surface area, but also to cause the silica to be evenly distributed through the polymer electrolyte. A desirable mean particle size is 0.05 micron or less, and preferably 0.01 micron or less. The surface area in the BET measuring method is 100 m$^2$/g or more, and preferably 200 m$^2$/g. Examples of some suitable fine particle silicas are: Aerosil 380™ from Nippon Aerosil, Cab-O-Sil™ Garde EH-5 from Cabot Corporation, and Snowtex-O™ (constituting a dispersion of silica in water or alcohol) from Nissan Chemical Industries Ltd. In this case, the water within the dispersion should be removed before adding liquid solvent electrolytes.

In the same manner, very high surface area alumina can be substituted for the silica, with similar desirable particle size and surface area, and is available from Degussa Corporation.

Another embodiment of the invention resides in forming hybrid base polymer blends in which the film is mechanically stronger than base PVDF and the final polymer electrolyte is stronger when in contact with liquid electrolyte. Representative examples indicate that polymers prepared with PP and PVDF, and polymers prepared with PEN and PVDF, in varying ratios with high surface area silica or alumina inorganic filler, have greater mechanical strength than the homopolymer PVDF. PVDF-solvent polymer tends to stretch when pulled, whereas the hybrid polymer blends of the present invention offer greater resilience with less tendency to stretch and thereby suffer damage. The ability of PVDF-solvent polymer to stretch suggests that solvent retention in the polymer is weakened.

Although the conductivity of a gelled polymer electrolyte can be increased by the incorporation of conductive liquid organic solvents, e.g., a lithium salt dissolved in EC-DEC, the integrity of the liquid electrolyte in the polymer remains the same as that of PVDF-liquid electrolyte material, to an extent. Another embodiment of the invention provides a means for generating a high ionic conductivity of the polymer electrolyte at reduced levels of liquid organic solvents. This is achieved by introducing into the base polymer material containing the inorganic filler, a solution of an ionizable or non-ionizable liquid polymer in a concentration of from about 0.1 to 40 weight percent (compared to the base polymer) which contains the liquid organic solvent electrolyte and lithium salt and cross-linking the liquid polymer using radiation curing methods.

Cross-linking a cross-linkable liquid polymer using either ultraviolet (UV) or electron beam (EB) radiation is the most preferred method of immobilizing the liquid organic solvent electrolyte into the base polymer structure, although a non-ionizable liquid polymer may also reduce the mobility of the solvent from the polymer. Representative examples of cross-linkable polymers include those polymers based on acrylates and PEO-based materials; and those based on non-cross-linkable polymers include MEEP, polyacrylonitrile, and so forth. Cross-linking is most preferred because the liquid polymer molecule traps the solvent molecule during radiation curing into the pores of the base polymer. The applicant herein has found that no restriction exists on the type of liquid polymer material used. However, it is preferable to use a polymer having a hetero atom with a lone pair of electrons for the metal ions of the salt to latch onto and move during the conduction process from one lone pair site to another.

Preferable polymers include MEEP which demonstrates excellent ionic conductivities at room temperature ($10^{-5}$ S/cm), or more preferably acrylates which have excellent solvent retention properties and can be cured in-situ trapping the solvents within the polymer.

The base hybrid polymer thus formed is no longer crystalline, but predominantly amorphous in nature.

The applicant has further found that even the use of a worse conductive polymer which can be cross-linked, such as PEO, still works very well in the invention. The liquid polymer material, such as cross-linkable PEO, is then complexed with a metal salt, preferably a plasticizer salt of a metal, e.g. lithium bis(trifluoromethane sulfonyl) imide, $LiN(CF_3SO_2)_2$ or lithium methide, $LiC(SO_2CF_3)_3$ and about 5 to 75% liquid organic solvents such as EC-DEC or EC-DMC, which yields a conductivity of about $10^{-3}$ to $3 \times 10^{-2}$ S/cm. Polymers based on various acrylate compositions and lithium imide salt also yield such conductivity values, and some compositions are half an order of magnitude or more higher than those based on PEO. A compromise must be made, however, between conductivity and mechanical strength. The applicant herein has also found that the use of the inorganic fillers enhances the ionic conductivity of the polymer electrolyte by about half an order of magnitude compared to an absence of filler, in addition to enhancing the mechanical properties and porosity of the base polymer. The increase in ionic conduction through the use of an insulator in an ionic conductor is akin to conductivity enhancement in lithium iodide electrolyte as described by C. C. Liang, J. Electrochem. Soc., v.120, p. 1289 (1973).

It will be appreciated that the present invention allows fabrication of very thin, low resistance, flexible films of this polymer electrolyte, without loss of mechanical integrity, conductivity, and mechanical strength. By virtue of introducing the above-described preferred methods, which produce excellent mechanical strength and porosity of the base polymer via the copolymer hybrid design and addition of high surface area alumina or silica, reduce the swelling properties of the polymer with liquid solvents, reduce the level of liquid solvents into the polymer, improve the ionic conductivity of the polymer electrolyte by introducing plasticizer salts and ionically conductive polymers into the base polymer, and immobilizing the solvents, gelled polymer electrolytes as thin as 10 microns or less can be manufactured simply by selective use of the various components of the polymer electrolyte. Such polymer electrolytes are not only thin, but truly flexible; and the thinness of the structure allows the possibility of lower resistances than are available from liquid electrolytes absorbed in traditional polypropylene separators. Traditional separator materials are usually at least 25 microns thick, and the conductivity of the solvent electrolyte is usually about $10^{-3}$ to $10^{-2}$ S/cm at room temperature. The design of gelled polymer electrolytes according to the present invention suggests that the effective resistance for thinner polymer electrolyte sections should be at least half that observed in liquid electrolytes alone. For example, a liquid electrolyte absorbed in a 25 micron polypropylene separator has an effective resistance of about 0.25 ohm, while a 10 micron polymer electrolyte fabricated according to one of the methods of the invention, with comparable ionic conductivity, has an effective resistance of only about 0.1 ohm. In addition, the thinness of the polymer electrolyte allows the film to be highly flexible.

According to yet another embodiment of the present invention, an electrochemical cell is provided having improved performance, in which the cell has a polymer electrolyte layer fabricated as one of the above-described embodiments, and an anode and cathode. Each of the anode and the cathode is selected from a group of materials that provides a very high capacity. The active cathode may be selected from a wide range of oxides, sulfides and selenides, or any other group well known in the prior art, e.g., $LiMn_2O_4$, $Li_xMnO_2$, $Li_xCoO_2$, $Li_xV_2O_5$, $LiV_3O_8$, $Li_xV_2S_5$, $Li_xNbSe_3$, $Li_xNiO_2$, $Li_xNi_yCO_2O_2$, $Li_xNi_yMn_2O_2$, $Li_xCo_yMn_2O_2$, lithium doped electronically conducting polymers such as polypyrrole, polyaniline, polyacetylene, and so forth. By way of example but not of limitation, the active anode may be selected from the group including tin oxide, ion-insertion polymers, ion-insertion inorganic electrodes, and carbon insertion electrodes.

Lithium primary battery electrodes are traditionally made by calendaring the cathode paste onto a nickel or stainless steel gauze and compacting between heated rollers. In the case of lithium metal anodes the gauze is used as a substrate material. The substrate material is typically about 2 to 3 mils thick. The anode and cathode are typically about 5 to 10 mils thick, with a microporous polypropylene separator sandwiched between them, and wound in a jelly-roll manner. Usually, the laminates are very thick and the electrode length is about two feet in a typical AA size cell. Rechargeable lithium metal anode batteries were also constructed in this manner.

These techniques have changed considerably with the advent of lithium ion battery construction. The carbon anode is pasted in relatively thin film form onto a copper foil electrode, and the lithiated metal oxide cathode is pasted onto an aluminum foil. The substrate thickness for both anode and cathode is in a range from about 25 to 35 microns, and the active electrode is about 25 microns thick. Additionally, the length of each electrode in a typical AA size cell is about twice that of lithium anode cells. Present electrode/electrolyte component thickness in gelled electrolyte lithium ion cells is of the order of 50 to 75 microns each.

This remains far too thick for optimum electrode utilization and high rate capability. Metallic current collectors are also used, not only adding weight but unwanted thickness to the battery. The thick electrode concept in commercial cells is designed for maximum capacity, while the thick gelled PVDF electrolyte provides ease of handling. However, the internal resistance of this battery is still relatively higher than its liquid electrolyte counterpart, thus decreasing battery performance. Cells constructed from such a design cannot be used at high discharge and charge rates. Thick inactive substrates used in such cell construction effectively reduce the energy density of the battery. In addition, this design exposes the cells to risk of high polarization during charge and discharge, which could lead to breakdown of the liquid solvent electrolyte and consequently loss of capacity, loss of cycle life and inadequate safety.

In yet another of its aspects, the present invention incorporates ultra thin film metal substrates in thin film lithium rechargeable batteries, in preferred thickness less than 5 microns and more preferably less than 2 microns. At present, minimum thickness available for copper or aluminum foil is about 5 microns. The design of novel polymer electrolytes of this invention is in tandem with the design of very thin electrodes/electrolytes fabricated with low cost, very large surface area, very thin inactive current collectors. Very thin film (e.g., <<5 microns/<<10 microns) battery electrode/electrolyte structures designed with very thin metallized polymer films (e.g., 1 micron) as the substrate material have several significant advantages. They enable fabrication of low resistance cells that can operate efficiently at the lower temperatures with significantly improved materials utilization, provide lower polarization with attendant greater energy efficiency and safety, and offer the potential for unprecedented cycle life of several tens of thousands of cycles from a bulk battery system. The present invention uses either very thin metallic elements less than 10 microns thick, preferably<0.01 micron, of metallized copper, onto either PET, PP, PPS, PEN, PVDF or PE for the anode, and metallized aluminum onto either PET, PP, PPS, PEN, PVDF or PE for the cathode. It should be understood that the invention is not limited to copper or aluminum metallization on the polymer substrate, but may readily be extended to other metallic elements such as nickel, zinc, stainless steel, alloys of such elements, or other alloys such as inconel, for example. The polymer substrate layer ranges in thickness from 0.5 micron to greater than 50 microns, while the thickness of the metallic layer is dependent upon the conductivity requirement and the desired resistivity of the metal.

In a lithium ion battery design, the cathode is coated on an aluminum metallized polymer. Such material has been found to have the resistivity (expressed as ohms per square) with thickness of the deposit as shown in Table 2 below.

TABLE 2

Resistivity as a Function of Metal Thickness for Aluminum

| Resistivity (ohms per square) | Metal Thickness (Angstroms) |
|---|---|
| 0.1 | 3000 |
| 0.3 | 1000 |
| 0.37 | 800 |
| 0.5 | 600 |
| 0.75 | 400 |
| 1 | 300 |
| 1.5 | 200 |
| 2 | 150 |
| 2.5 | 113 |
| 3 | 100 |

Resistivity as a function of copper thickness on metallized polyester is indicated in Table 3 below:

TABLE 3

Resistivity as a Function of Metal Thickness for Copper

| Resistivity (ohms per square) | Metal Thickness (Angstroms) |
|---|---|
| 0.1 | 1500 |
| 0.2 | 750 |
| 0.3 | 600 |
| 0.4 | 300 |
| 0.5 | 200 |
| 1 | 100 |

Each polymer substrate electrode material has different characteristics and thermal and mechanical properties, and each behaves differently depending upon its use. Ideally, the thickness of the metal coating should be kept as thin as possible, while concurrently ensuring that its conductivity is very high. Preferably, the coating thickness has a conductivity of less than about 1.0 ohm per square, preferably less than 0.1 ohm per square, and more preferably about 0.01 ohm per square. This will ensure low resistance loss during current drain from the metallized substrate. The metallization may be present on only one side of the polymer layer or substrate, but is preferably provided on both sides thereof. Further, the metallization preferably is accomplished to leave an unmetallized margin or non-metallized margin having a width in a range from about one millimeter (mm) to about three mm. Where the metallization is present at both sides of the polymer substrate, the non-metallization margin is provided at opposite sides of the polymer material, but on the same edge. When the substrate is coated with the active material, the coating material will be applied to the metallized portion and not the margin.

The invention in another of its aspects also resides in methods of coating the thin substrate with very thin film active anode and cathode material. Conventional calendaring of the anode and cathode from paste or knife-over-roll or doctor blades techniques will not lead to the desired thickness. Instead the invention teaches a method whereby the active anode and cathode materials are milled extensively in a solvent to reduce the particle size, and then injected directly onto the substrate and subsequently drawn into thin films of various thickness using wire wound rods or Mayer rods of different wire diameters. The different diameter wire controls the wet slurry thickness. This method, which to the applicant's knowledge has not been used previously in the battery industry to manufacture electrodes, yields an electrode material that is extremely uniform and thin. Dry film thickness of 1 micron to greater than 100 microns can be controlled using this process. The coating may also be made either by spraying atomized aerosol directly onto a high speed moving substrate and curing either by drying or radiation (if the material contains radiation curable elements), or by evaporation of the electrode material directly onto the substrate.

Thinner electrode structures also have the advantage that they undergo significantly less expansion and contraction during discharge and charge. The polymeric structures within the battery (i.e., the metallized film substrates, and polymer film electrolyte) should also accommodate these phenomena. Since the composite cathode and anode structure must be as thin and smooth as possible, it is desirable to perform extensive, high speed, wet attrition milling of the electrode formulation (i.e., active cathode or anode, carbon, lithium salt, solvents, binder) so as to obtain thin electrode films of the same form of consistency as audio and video magnetic tapes. Final particle size of the composite electrodes is less than 0.1 micron, and preferably less than 0.05 micron. This will ensure a very thin film and smooth electrode during the coating process.

The invention provides very thin film, strong, and yet flexible and highly conductive polymeric electrolyte and electrode structures, similar to film capacitor dielectric material that can be tightly wound in formation of the capacitor.

Figure 1:
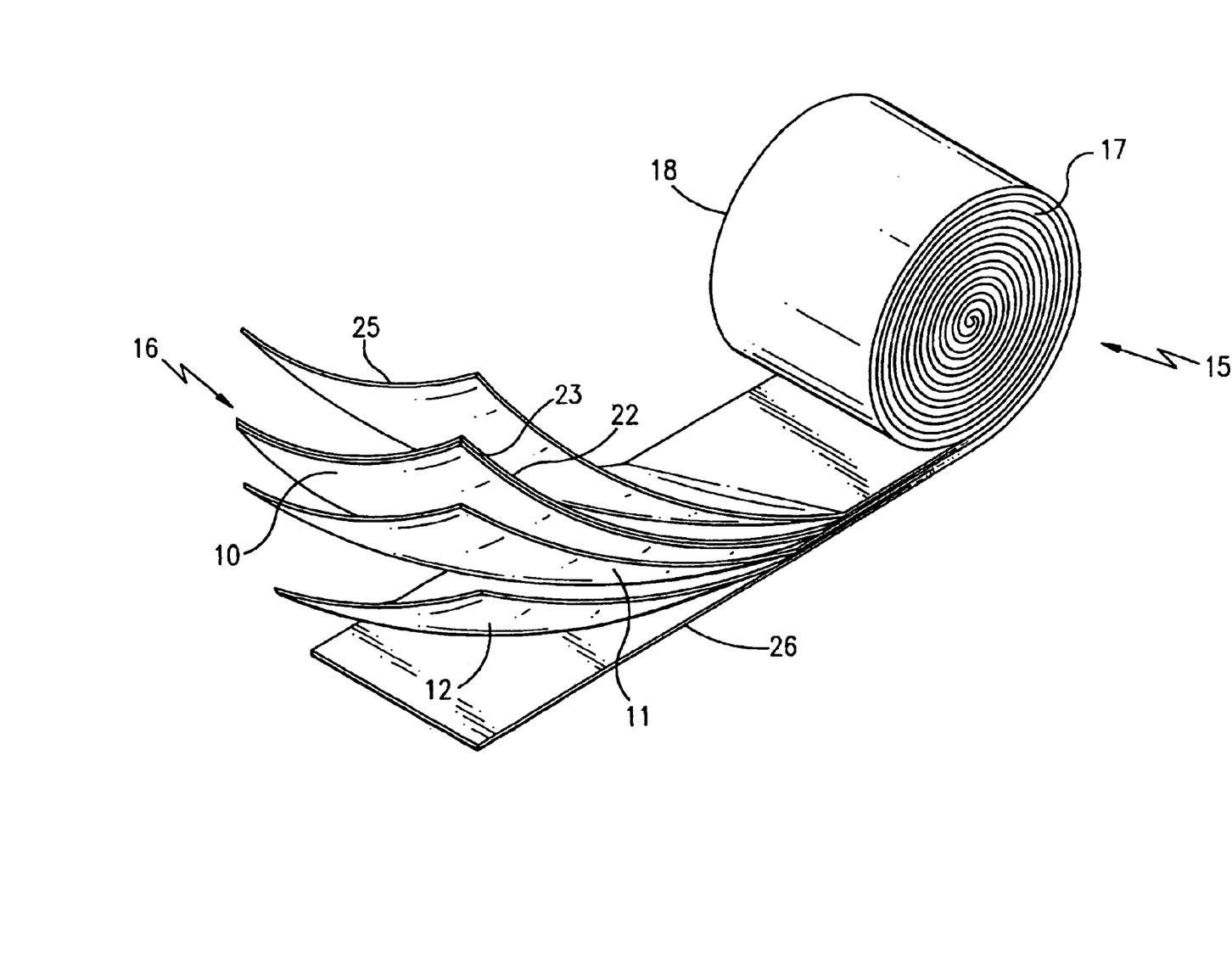
The sole FIGURE is a perspective and partly exploded view of the layout of a lithium ion polymer electrolyte battery which is useful in describing the final structure embodying the present invention.

Referring to the sole FIGURE of drawing, the three principal webs, comprising anode 10, hybrid polymer electrolyte film 11 and cathode 12 are wound as illustrated in the FIGURE, or, alternatively, may be stacked or laminated, to form lithium ion polymer battery 15. A tightly wound construction removes air from between the layers, and allows enhanced and continuous contact between the layers. The exercise of care is essential to avoid electrical shorting of the beginning of the turns. The tightly wound battery-capacitor hybrid is taped at the edge 16, and may then be strapped in a tray (not shown) which is open on both sides. This provides access to both ends 17 and 18 of the battery 15 for schooping or, preferably, metal spraying thereof, first with a high zinc content solder (harder material) followed by a regular softer "Babbitt" end spray solder (90% tin:10% zinc). The first end spray scratches the metallized surface and creates a trough to build a better electrical and mechanical contact. The tight wind and offset spacing prevents the zinc from penetrating to the active components. This combination of end sprays also allows better contact adhesion with the final termination.

Subsequently, aluminum leads (not shown) are soldered onto each of the ends 17 and 18 to form the final termination. The battery may then be epoxied to maintain pressure on the cell as well as to protect it further from humidity. This battery-capacitor hybrid 15 is heated to about 80° C. for a period of from 2 to 5 minutes, to improve the interface. If desired, it may be heated under vacuum before epoxying, to improve the interface even further.

According to a further aspect of the present invention, the anode and cathode elements are preferably laminated on both sides of a double-metallized polymer substrate material so as to yield a highly flexible electrode. By way of contrast, in a typical state-of-the-art lithium ion battery, a carbon anode is calendared on both sides of a copper current collector. Rather, in the thin film, flexible battery 15 of the invention, the carbon 22, for example, is laminated or coated in a very thin film on both sides of copper metallized polymer (e.g., PET) material 23 so that no distortion or damage to the carbon electrode will occur during the winding operation of the cell components. If even thinner electrode structures are desired, it is preferable that the electrode material be evaporated directly onto the metallized polymer. A similar structure (apart from the specific materials employed, e.g., aluminum rather than copper for the metallization) may exist for the cathode. An insulator sheet 25 and a metallized PET current collector 26 complete the assembly prior to winding.

In some cases, it is desirable that the coating of the anode and cathode be carried out with a margin, especially if the tabbing or current lead can be placed at the end of the jelly-roll structure. The use of metallized plastic substrates in thickness of 0.7 micron reduces the inactive components of the cell significantly, compared to state-of-the-art lithium ion polymer electrolyte battery substrate material, thereby increasing the energy density of the battery even further. In a typical lithium metal anode battery, the ratio of substrate thickness to electrode thickness is about 0.8 to 1. In batteries according to the invention, if the ratio of substrate thickness to electrode thickness can be reduced to less than 0.5, when combined with reduced electrolyte thickness and reduced dead space at the top and bottom of the jelly roll structure, a significant improvement is obtained in the energy density, rate capability, reliability, cycle life, and safety over the prior art device.

The combined use of advanced thin film battery technology and manufacturing processes of film capacitors disclosed herein enables the development of novel power source technologies that can satisfy many of the requirements which are not presently met by state-of-the-art batteries.

It will thus be recognized that polymer electrolytes fabricated in very thin film form can be used with thin film anode and cathode electrodes. By designing a battery based on very thin film active and inactive components, the surface area of the active plates can be effectively increased to provide the battery with higher current drain capability, lower resistance, higher energy content, lower self-discharge, wide operating temperature range, absence of dendrite formation, higher efficiency, higher capacity utilization, greater cycle life, and improved reliability and safety. Such a battery is able to tolerate overcharge, without emission of any deleterious species or outgassing. Furthermore, when designed around very thin metallized polymer films (1 micron) as the substrate material, the energy density may be expected to improve by at least 25 to 40% over state-of-the-art lithium ion batteries, with reduced cost. A method of producing cells with the above attributes is to manufacture very thin film cell components, and once the individual cell components have been laminated, the finished cell is heated to about 60–80° C. for about 2 hours. This enhances the electrode/electrolyte interface and allows better interfacial adhesion and improved cyclability.

Although certain preferred embodiments and methods have been disclosed herein, it will be appreciated by those skilled in the art to which the invention pertains, from a consideration of the foregoing description, that variations and modifications may be made without departing from the spirit and scope of the invention. Accordingly, it is intended that the invention shall be limited only by the appended claims and the rules and principles of applicable law.

What is claimed is:

1. An ionically conductive polymer electrolyte, comprising
    at least two constituent polymers homogeneously mixed in a hybrid copolymer solid solution blend of predominantly amorphous structure constituting a base polymer,
    one of said constituent polymers selected from a polar group of polymers adapted for pronounced solvent retention.
    another of said constituent polymers selected from a group consisting of one or more of polyester (PET) polypropylene (PP), polyethylene napthalate (PEN), polycarbonate (PC), polyphenylene sulfide (PPS), and polytetrafluoroethylene (PTFE) in a ratio of concentrations of said constituent polymers in said solid solution to infuse said base polymer with a predetermined property among enhanced strength, processing capability, thermal stability, and mechanical stability, and
    an electrolyte solution heavily absorbed within said base polymer without substantial swelling thereof, wherein
    said hybrid copolymer solid solution blend comprises a thin film that includes:
        a very high surface area inorganic filler consisting of one of fumed silica or alumina in a concentration range from about 0.1% to about 30% by weight dispersed into said hybrid copolymer solid solution blend to create porosity therein and to enhance the mechanical stability of said thin film; and
    said electrolyte solution is a liquid solvent electrolyte absorbed into said thin film.

2. The polymer electrolyte of claim 1, wherein: said one constituent polymer is polyvinylidene fluoride (PVDF).

3. The polymer electrolyte of claim 1, wherein:
    said homogeneously mixed constituent polymers are co-extruded, and
    said inorganic filler is dispersed therein as the constituent polymers are co-extruded.

4. The polymer electrolyte of claim 1, wherein:
    said inorganic filler is fumed silica in the form of highly pure silica in amorphous crystalline structure with fine particle size less than 0.05 micron and high specific surface area greater than 100 $m_2/g$, said fumed silica inorganic filler thereby being substantially evenly distributed in said dispersal throughout the hybrid copolymer solid solution blend.

5. The polymer electrolyte of claim 1, wherein:
    said inorganic filler is alumina with fine particle size less than 0.05 micron and high specific surface area greater than 100 $m_2/g$, said alumina inorganic filler thereby being substantially evenly distributed in said dispersal throughout the hybrid copolymer solid solution blend.

6. An ionically conductive polymer electrolyte, comprising
    at least two constituent polymers homogeneously mixed in a hybrid copolymer solid solution blend of predominantly amorphous structure constituting a base polymer,
    one of said constituent polymer selected from a polar group of polymers adapted for pronounced solvent retention,
    another of said constituent polymers selected from a group consisting of one or more of polyester (PET), polypropylene (PP), polyethylene napthalate (PEN), polycarbonate (PC), polyphenylene sulfide (PPS), and polytetrafluoroethylene (PTFE) in a ratio of concentrations of said constituent polymers in said solid solution to infuse said base polymer with a predetermined property among enhanced strength, processing capability, thermal stability, and mechanical stability, and an electrolyte solution heavily absorbed within said base polymer without substantial swelling thereof, wherein said base polymer comprises a thin film that includes:
  a very high surface area inorganic filler contained therein for porosity and enhanced mechanical stability of said thin film; and
  said electrolyte solution contains lithium salt for ionic conduction and enhanced absorption of said electrolyte solution into said thin film.

7. The polymer electrolyte of claim 6, wherein said lithium salt is dispersed in said electrolyte solution in a solvent mixture of at least one of ethylenecarbonate-diethyl carbonate (EC-DEC), ethylenecarbonate-dimethyl carbonate (EC-DMC), PC-EC-DMC or PC-DEC.

8. The polymer electrolyte of claim 6, wherein said lithium salt is selected from a group including lithium hexafluorophosphase $LiPF_6$, lithium perchlorate $LiClO_4$, lithium tetrafluoro-borate $LiBF_4$, lithium hexafluoroarsenate $LiAsF_6$, lithium tetrachloroaluminate $LiAlCl_4$, lithium trifluoromethane sulfonate $LiCF_3SO_3$, lithium bis(trifluoromethane sulfonyl) imide (lithium imide) $LiN(CF_3SO_2)_2$, and lithium methide $LiC(SO_2CF_3)_3$.

9. A thin film lithium ion battery, comprising:

a pair of spaced-apart flexible thin film electrodes, each including a polymer substrate having an adherent electrically conductive layer thereon, and a polymer electrolyte tightly sandwiched between said pair of thin film electrodes, said polymer electrolyte being ionically conductive and comprising
  at least two constituent polymers homogeneously mixed in a hybrid copolymer solid solution blend of predominantly amorphous structure constituting a base polymer, one of said constituent polymers selected from a polar group of polymers adapted for pronounced solvent retention,
  another of said constituent polymers selected from a group consisting of one or more of polyester (PET), polypropylene (PP), polyethylene napthalate (PEN), polycarbonate (PC), polyphenylene sulfide (PPS), and polytetrafluoroethylene (PTFE) in a ratio of concentrations of said constituent polymers in said solid solution to infuse said base polymer with a predetermined property among enhanced strength, processing capability, thermal stability, and mechanical stability, and
  an electrolyte solution heavily absorbed within said base polymer without substantial swelling thereof.

10. The polymer electrolyte of claim 6, wherein: said one constituent polymer is polyvinylidene fluoride (PVDF).

* * * * *